US011034027B2

(12) United States Patent
Johnson et al.

(10) Patent No.: US 11,034,027 B2
(45) Date of Patent: *Jun. 15, 2021

(54) ROBOT ASSISTED PERSONNEL ROUTING

(71) Applicant: Locus Robotics Corp., Wilmington, MA (US)

(72) Inventors: Michael Charles Johnson, Ashland, MA (US); Luis Jaquez, Burlington, MA (US); Sean Johnson, Danvers, MA (US)

(73) Assignee: Locus Robotics Corp., Wilmington, MA (US)

( * ) Notice: Subject to any disclaimer, the term of this patent is extended or adjusted under 35 U.S.C. 154(b) by 244 days.

This patent is subject to a terminal disclaimer.

(21) Appl. No.: 16/265,348

(22) Filed: Feb. 1, 2019

(65) Prior Publication Data

US 2020/0246978 A1 Aug. 6, 2020

(51) Int. Cl.
*B25J 13/06* (2006.01)
*B25J 9/00* (2006.01)
*B25J 9/16* (2006.01)

(52) U.S. Cl.
CPC .............. *B25J 13/06* (2013.01); *B25J 9/0084* (2013.01); *B25J 9/1666* (2013.01)

(58) Field of Classification Search
CPC ........ B25J 13/06; B25J 9/0084; B25J 9/1666; B25J 9/1689; B25J 19/021; B25J 9/06; B25J 13/025; B25J 19/023; G06Q 10/08; G06Q 50/28; A61B 34/30; A61B 34/37; A61B 34/35; A61B 34/20; A61B 2034/301; A61B 90/361; A61B 2034/2055;

(Continued)

(56) References Cited

U.S. PATENT DOCUMENTS 9,463,927 B1 10/2016 Theobald
9,776,324 B1 10/2017 Johnson et al.
(Continued)

FOREIGN PATENT DOCUMENTS

WO 2018/132793 A1 7/2018

OTHER PUBLICATIONS

Rule et al., Designing interfaces for multi-user, multi-robot systems, 2012, IEEE, p. 97-104 (Year: 2012).*

(Continued)

*Primary Examiner* — McDieunel Marc
(74) *Attorney, Agent, or Firm* — Sunstein LLP

(57) ABSTRACT

Systems and methods for robot assisted personnel routing including a plurality of autonomous robots operating within a navigational space, each robot including a processor and a memory storing instructions that, when executed by the processor, cause the autonomous robot to detect completion of a task operation by a human operator, receive status information corresponding to at least one other robot, the status information including at least one of a location or a wait time associated with the other robot, determine, from the status information, at least one next task recommendation for directing the human operator to a next robot for a next task operation, and render, on a display of the robot, the at least one next task recommendation for viewing by the human operator, the next task recommendation including a location of the next robot corresponding to the next task.

20 Claims, 13 Drawing Sheets

(58) Field of Classification Search
CPC .............. A61B 2034/305; A61B 34/70; A61B 2090/3937; A61B 17/00234; A61B 34/25; A61B 90/37; A61B 2090/3983; A61B 34/74; A61B 34/76; A61B 17/0218; A61B 1/00149; A61B 1/00193; A61B 1/05; A61B 90/50; A61B 90/98; A61B 18/1445; A61B 2090/371; A61B 1/00087; A61B 2034/742; A61B 34/00; A61B 17/29; A61B 1/3132; A61B 2505/05; A61B 18/1477; A61B 1/00045; A61B 2017/3409; A61B 17/062; A61B 17/32; A61B 17/3201; A61B 17/34; A61B 18/1402; A61B 1/00006; A61B 1/00009; A61B 17/0483; A61B 17/1285; A61B 2017/00115; A61B 2017/00199; A61B 2017/00075; A61B 8/4444; Y10T 74/20305; A61F 2002/30785; A61F 2002/30892; G06F 19/00; G06F 3/016; G06F 3/0346; G06F 3/011; G05B 19/00; G05B 2219/40174; G05B 2219/50391; G06N 20/00; G06N 5/04; Y10S 901/02; Y10S 901/15

See application file for complete search history.

(56) References Cited

U.S. PATENT DOCUMENTS

| | | | |
|---|---|---|---|
| 9,829,333 | B1 | 11/2017 | Calder |
| 10,022,867 | B2 | 7/2018 | Saboo et al. |
| 10,296,995 | B2 | 5/2019 | Saboo et al. |
| 10,414,052 | B2 | 9/2019 | Deyle et al. |
| 10,513,033 | B2 | 12/2019 | Johnson et al. |
| 2007/0192910 | A1* | 8/2007 | Vu .......................... B25J 19/06 700/245 |
| 2010/0296908 | A1 | 11/2010 | Ko |
| 2011/0200420 | A1 | 8/2011 | Driskill et al. |
| 2012/0152877 | A1 | 6/2012 | Tadayon |
| 2012/0330458 | A1 | 12/2012 | Weiss |
| 2013/0317642 | A1 | 11/2013 | Asaria et al. |
| 2015/0088310 | A1* | 3/2015 | Pinter .................... G16H 40/67 700/253 |
| 2015/0360865 | A1 | 12/2015 | Massey |
| 2015/0367513 | A1 | 12/2015 | Gettings et al. |
| 2017/0285648 | A1 | 10/2017 | Welty et al. |
| 2017/0286916 | A1 | 10/2017 | Skiba et al. |
| 2018/0059635 | A1 | 3/2018 | Johnson et al. |
| 2018/0201444 | A1* | 7/2018 | Welty .................... B65G 1/0492 |
| 2018/0239343 | A1 | 8/2018 | Voorhies et al. |
| 2019/0138978 | A1 | 5/2019 | Johnson et al. |
| 2020/0033867 | A1 | 1/2020 | Grant et al. |
| 2020/0061839 | A1* | 2/2020 | Deyle .................... B25J 9/1664 |
| 2020/0239231 | A1 | 7/2020 | Johnson et al. |
| 2020/0246972 | A1 | 8/2020 | Johnson et al. |
| 2020/0275984 | A1* | 9/2020 | Brisson .................. A61B 34/35 |

OTHER PUBLICATIONS

Shiomi et al., Field trial of networked social robots in a shopping mall, 2009, IEEE, p. 2846-2853 (Year: 2009).*

Hughes et al., Camera orientation: an opportunity for human-robot collaborative control, 2005, IEEE, p. 1-6 (Year: 2005).*

Trouvain et al., Comparison of a map- vs. camera-based user interface in a multi-robot navigation task, 2003, IEEE, p. 3224-3231 (Year: 2003).*

International Search Report with Written Opinion, dated Mar. 30, 2020, received in international patent application No. PCT/US2020/16055, 13 pages.

International Search Report with Written Opinion, dated Mar. 31, 2020, received in international patent application No. PCT/US2020/016193, 11 pages.

International Search Report with Written Opinion, dated Apr. 1, 2020, received in international patent application No. PCT/US2020/015811, 11 pages.

* cited by examiner

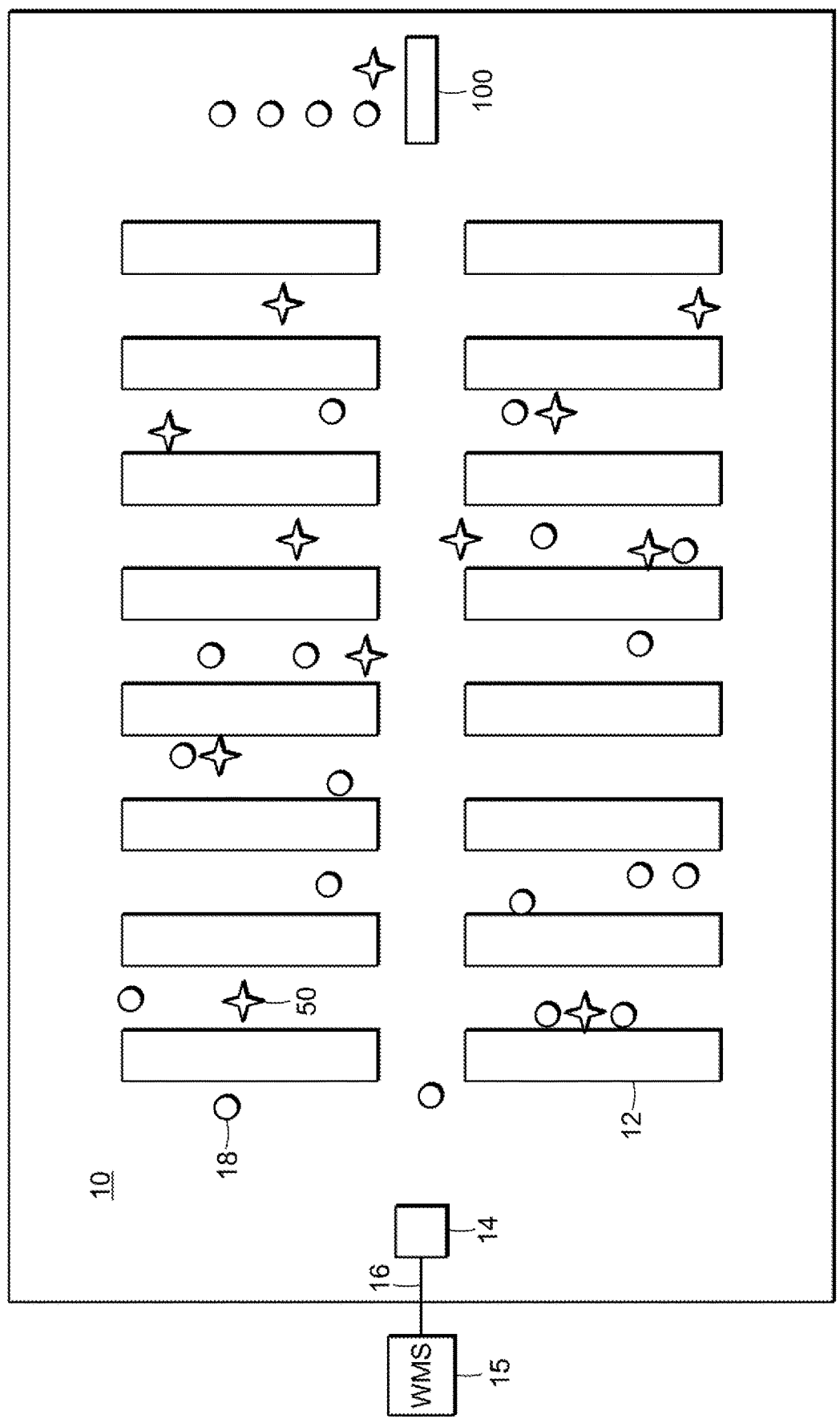

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

402a → L01001A
402b → L01001B
402c → L01001C
402d → L01001D
402e → L01001E
402f → L01001F

404 → Fiducial ID

FIG. 7

ROBOT ASSISTED PERSONNEL ROUTING

FIELD OF THE INVENTION

This invention relates to personnel routing and more particularly to robot assisted personnel routing.

BACKGROUND OF THE INVENTION

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

In order to increase efficiency, robots may be used to perform functions of humans or they may be used to supplement the humans' activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

To the extent that human operators are deployed to assist robots within a shared navigational space, the human operators, absent direction, can be underutilized, thereby reducing human operator efficiency, increasing robot dwell time, and causing confusion and/or congestion within the shared navigational space. For example, a human operator may complete a task in current aisle and be ready to assist the next robot only to find that there are no robots needing assistance in sight. Such an operator could simply wait for a robot to approach or may guess and head in a particular direction hoping to locate a robot in need of assistance. However, because the operator is merely guessing or waiting, this approach is unlikely to consistently create an efficient result. Furthermore, without guidance or direction, multiple human operators may initially pursue the same robot. The operators then waste the time necessary to travel to the target robot and, once the operators realize they are pursuing the same robot, need to waste time reconciling with each other which operator will assist the target robot and, for the other human operator(s), go through the process of finding and traveling to another robot to assist.

BRIEF SUMMARY OF THE INVENTION

Provided herein are systems and methods for robot assisted personnel routing.

In one aspect, a robot assisted personnel routing system is provided. The system includes a plurality of autonomous robots operating within a navigational space. Each robot includes a processor. Each robot also includes a memory. The memory stores instructions that, when executed by the processor, cause the autonomous robot to detect completion of a task operation by a human operator. The memory also stores instructions that, when executed by the processor, cause the autonomous robot to receive status information corresponding to at least one other robot, the status information including at least one of a location or a wait time associated with the other robot. The memory also stores instructions that, when executed by the processor, cause the autonomous robot to determine, from the status information, at least one next task recommendation for directing the human operator to a next robot for a next task operation. The memory also stores instructions that, when executed by the processor, cause the autonomous robot to render, on a display of the robot, the at least one next task recommendation for viewing by the human operator, the next task recommendation including a location of the next robot corresponding to the next task.

In some embodiments, the status information includes an (x,y,z) position of the at least one other robot within the navigational space. In some embodiments, the next robot is selected by determining a minimum straight line distance to the at least one other robot. In some embodiments, the next robot is selected in response to one or more efficiency factors, including dwell time of the at least one other robot, straight-line proximity of the at least one other robot, number of human operators proximate the at least one other robot, walking distance to the at least one other robot, priority of a task associated with the at least one other robot, congestion proximate the at least one other robot, or combinations thereof. In some embodiments, the next task recommendation is rendered as an interactive graphic on the display. In some embodiments, responsive to human operator input received by the interactive graphic, an expanded graphic is rendered to one or more of provide additional information about the next task operation associated with the next task recommendation, present additional next task recommendations to the human operator, or combinations thereof. In some embodiments, the expanded graphic includes one or more additional interactive graphics.

In some embodiments, the interactive graphic is configured to record a selection by the human operator of a next task operation from the at least one next task recommendation. In some embodiments, the memory also stores instructions that, when executed by the processor, cause the autonomous robot to, responsive to recordation of the next task selection, designate the selected task operation as in process within the personnel routing system to avoid redundant recommendation. In some embodiments, the in process designation is removed if the selected task operation is not completed within a prescribed time limit. In some embodiments, the status information is directly received from the at least one other robot. In some embodiments, the status information is received from a robot monitoring server for monitoring robots within the navigational space, wherein the robot monitoring server is at least one of integrated with at least one of an order-server of the navigational space, integrated with a warehouse management system of the navigational space, a standalone server, a distributed system comprising the processor and the memory of at least two of the plurality of robots, or combinations thereof. In some embodiments, the navigational space is a warehouse. In some embodiments, the at least one next task operation is at least one of a pick operation, a put operation, or combinations thereof to be executed within the warehouse.

In another aspect, a method for robot assisted personnel routing is provided. The method includes detecting, by a processor and a memory of one of a plurality of autonomous robots operating within a navigational space, completion of a task operation by a human operator. The method also includes receiving, by a transceiver of the autonomous robot, status information corresponding to at least one other robot, the status information including at least one of a location or a wait time associated with the other robot. The method also includes determining, from the status information, at least one next task recommendation for directing the human operator to a next robot for a next task operation. The method also includes rendering, on a display of the robot, the at least one next task recommendation for viewing by the human operator, the next task recommendation including a location of the next robot corresponding to the next task.

In some embodiments, the status information includes an (x,y,z) position of the at least one other robot within the navigational space. In some embodiments, the method also includes selecting the next robot by determining a minimum straight line distance to the at least one other robot. In some embodiments, the method also includes selecting the next robot responsive to one or more efficiency factors, including dwell time of the at least one other robot, straight-line proximity of the at least one other robot, number of human operators proximate the at least one other robot, walking distance to the at least one other robot, priority of a task associated with the at least one other robot, congestion proximate the at least one other robot, or combinations thereof. In some embodiments, the method also includes rendering the next task recommendation as an interactive graphic on the display. In some embodiments, the method also includes rendering an expanded graphic responsive to human operator input received by the interactive graphic to one or more of provide additional information about the next task operation associated with the next task recommendation, present additional next task recommendations to the human operator, or combinations thereof. In some embodiments, the expanded graphic includes one or more additional interactive graphics. In some embodiments, the method also includes recording, by the interactive graphic, a selection by the human operator of a next task operation from the at least one next task recommendation. In some embodiments, the method also includes designating, responsive to recordation of the next task selection, the selected task operation as in process within the personnel routing system to avoid redundant recommendation.

These and other features of the invention will be apparent from the following detailed description and the accompanying figures, in which:

BRIEF DESCRIPTION OF THE FIGURES

FIG. 1 is a top plan view of an order-fulfillment warehouse;

FIG. 6 is a table of the fiducial identification to pose mapping;

FIG. 7 is a table of the bin location to fiducial identification mapping;

DETAILED DESCRIPTION OF INVENTION

Figure 2A:
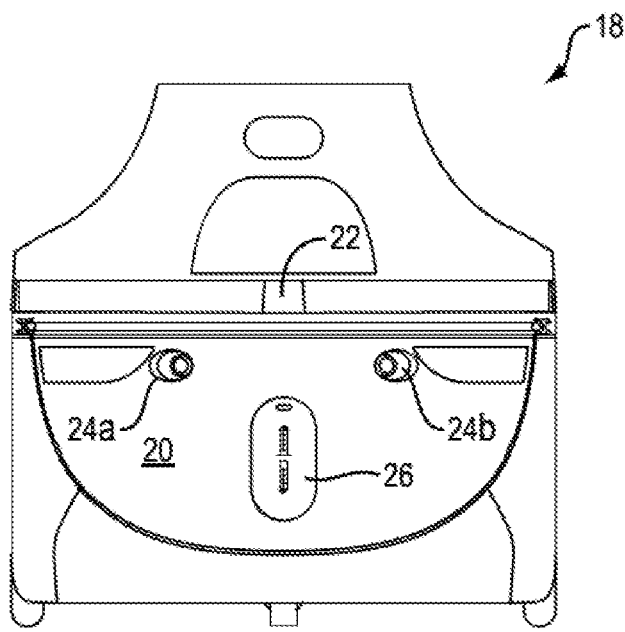
FIG. 2A is a front elevational view of a base of one of the robots used in the warehouse shown in FIG. 1.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to robot congestion management. Although not restricted to any particular robot application, one suitable application that the invention may be used in is order fulfillment. The use of robots in this application will be described to provide context for robot congestion management but is not limited to that application.

Referring to FIG. 1, a typical order-fulfillment warehouse 10 includes shelves 12 filled with the various items that could be included in an order. In operation, an incoming stream of orders 16 from warehouse management server 15 arrive at an order-server 14. The order-server 14 may prioritize and group orders, among other things, for assignment to robots 18 during an induction process. As the robots are inducted by operators, at a processing station (e.g. station 100), the orders 16 are assigned and communicated to robots 18 wirelessly for execution. It will be understood by those skilled in the art that order server 14 may be a separate server with a discrete software system configured to interoperate with the warehouse management system server 15 and warehouse management software or the order server functionality may be integrated into the warehouse management software and run on the warehouse management server 15.

Figure 2B:
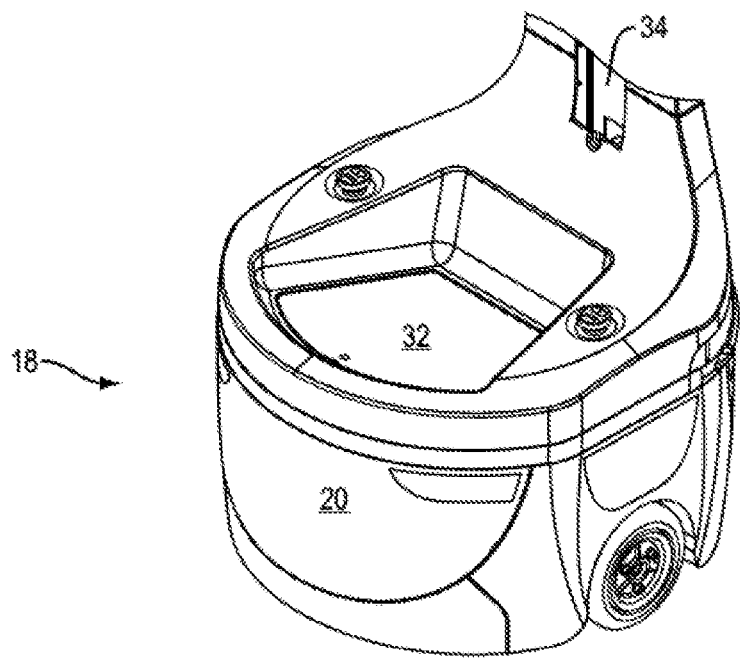
FIG. 2B is a perspective view of a base of one of the robots used in the warehouse shown in FIG. 1.
Figure 3:
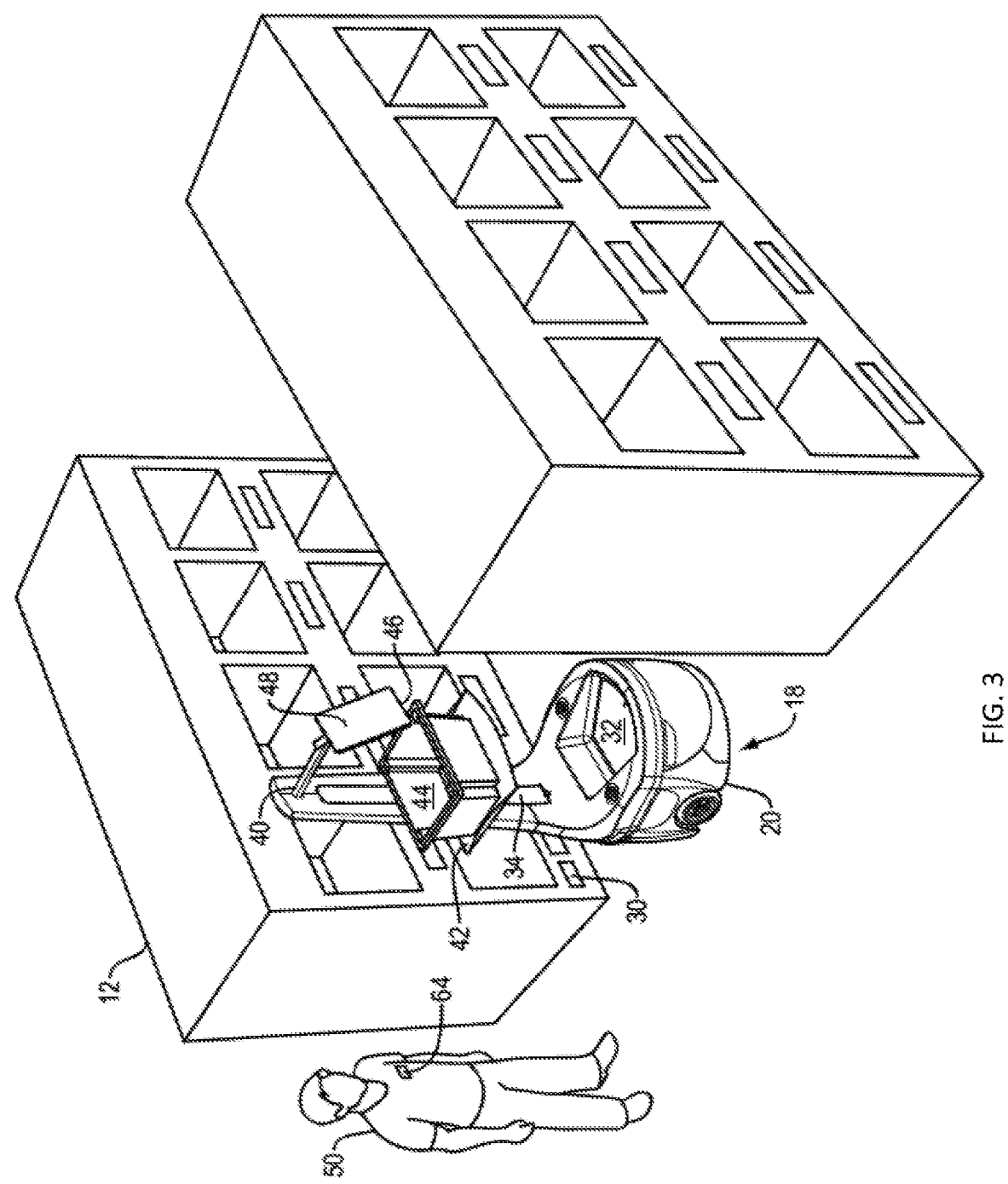
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for re-charging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location (pose), the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The baseline navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one or more of the robots 18 as they are navigating the warehouse they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
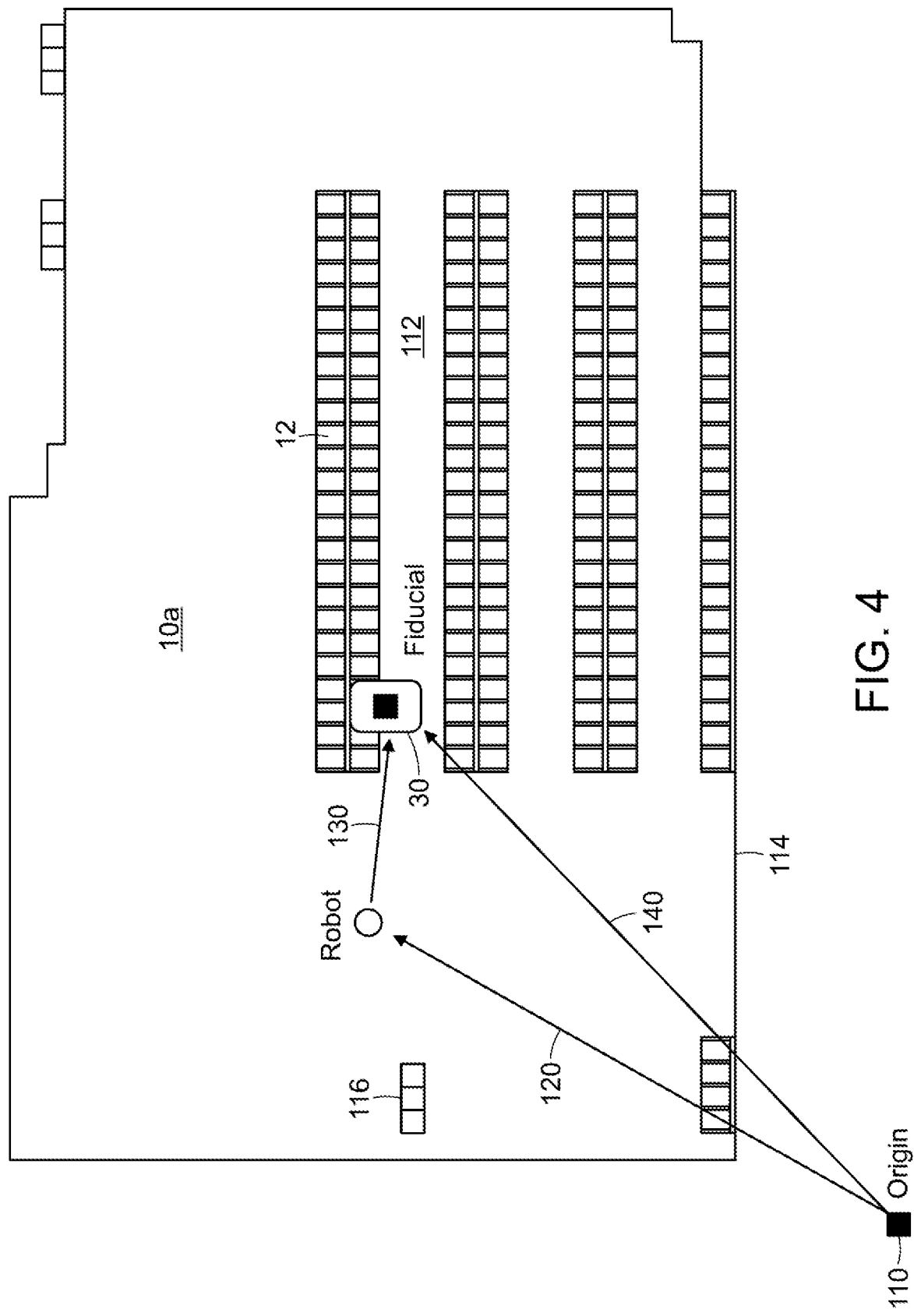
FIG. 4 is a partial map of the warehouse of FIG. 1 created using laser radar on the robot.

While constructing the map 10a (or updating it thereafter), one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
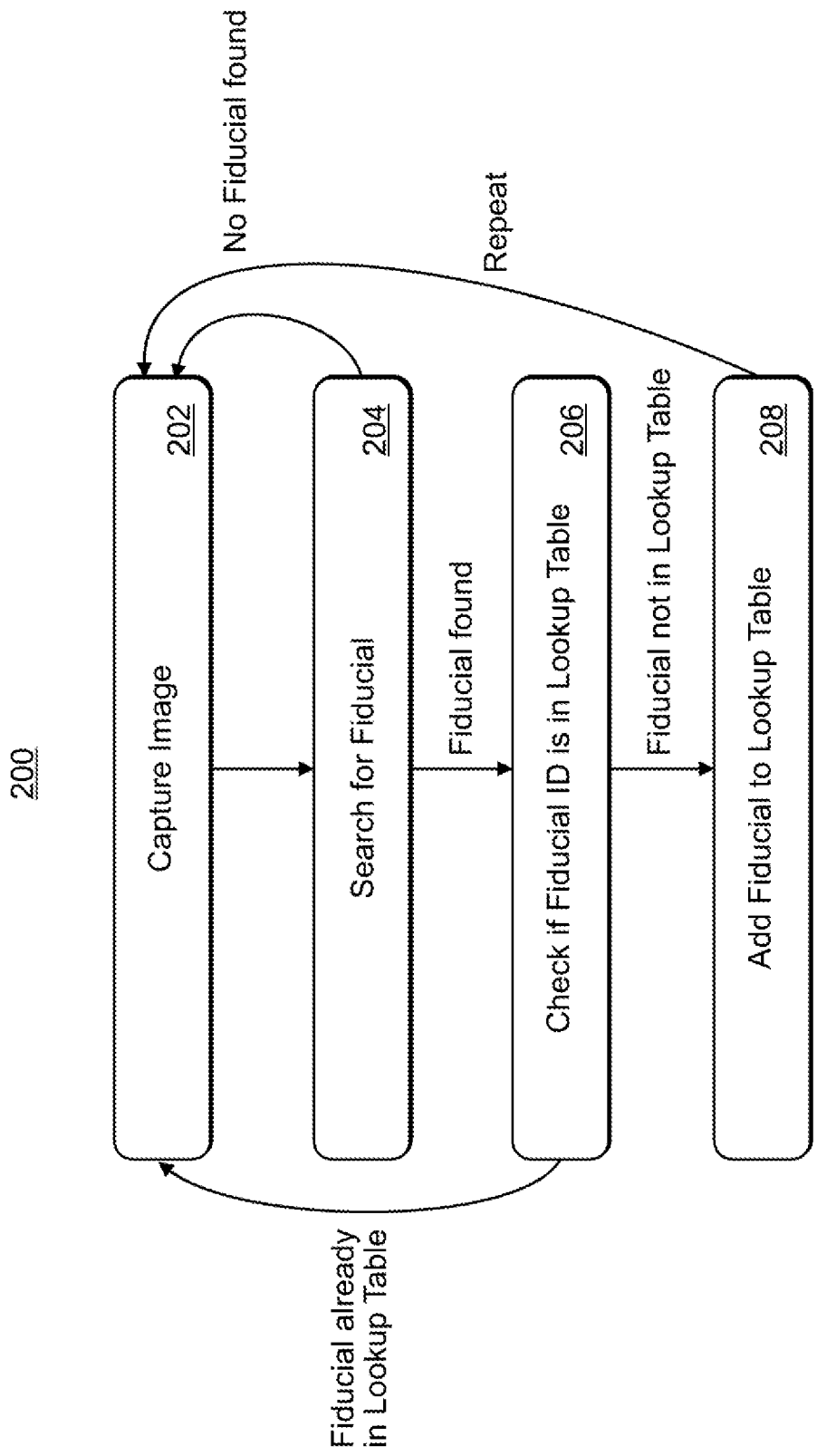
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402*a-f*) within warehouse 10, which are correlated to particular fiducial ID's 404, e.g. number "11". The bin locations, in this example, consist of seven alphanumeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial s, Robot 18 can determine the pose of the fiducial ID using the information in table 300, FIG. 6, and then navigate to the pose, as described herein.

Figure 8:
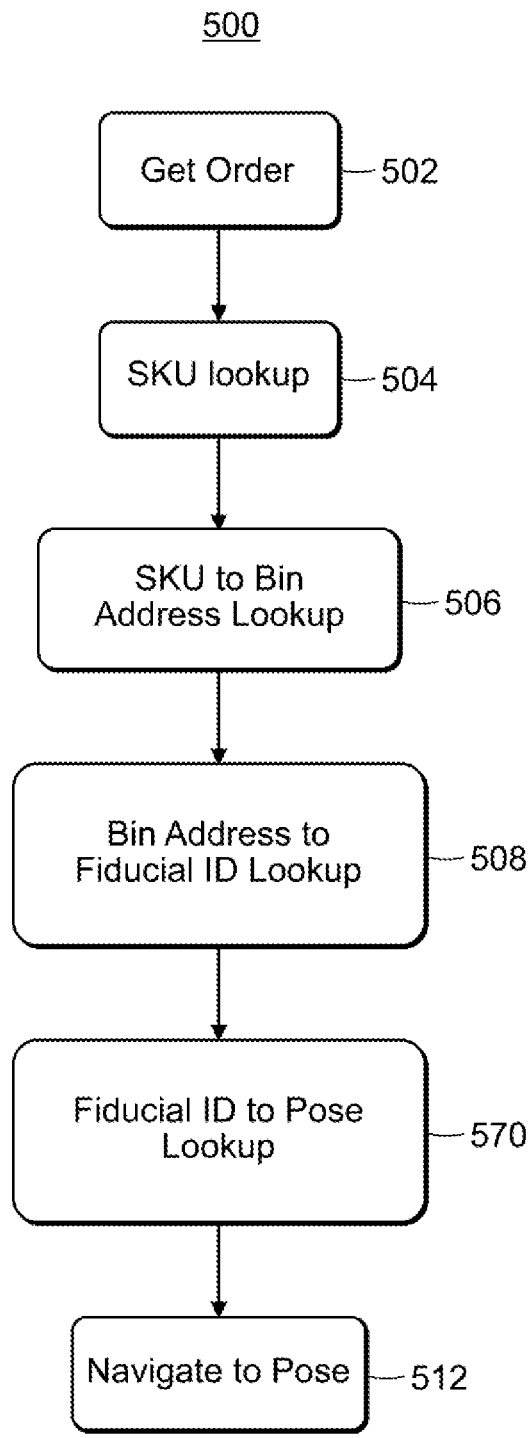
FIG. 8 is a flow chart depicting product SKU to pose mapping process.

The order fulfillment process according to this invention is depicted in flow chart 500, FIG. 8. In step 502, from warehouse management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per bin or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15/order server 14, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Robot Assisted Personnel Routing

In general, without direction, human operators 50 can be underutilized. For example, a human operator may complete a task in current aisle and be ready to assist the next robot only to find that there are no robots needing assistance in sight. Such an operator could simply wait for a robot to approach or may guess and head in a particular direction hoping to locate a robot in need of assistance. However, because the operator is merely guessing or waiting, this approach is unlikely to consistently create an efficient result. For example, without guidance or direction, multiple human operators 50 may initially pursue the same robot 18. The operators 50 then waste the time necessary to travel to the target robot 18 and, once the operators 50 realize they are pursuing the same robot 18, the operators 50 need to waste time reconciling amongst themselves which operator will assist the target robot and, for the other operator(s) 50, the process of finding and traveling to another robot 18 to assist will need to be repeated.

Figure 9:
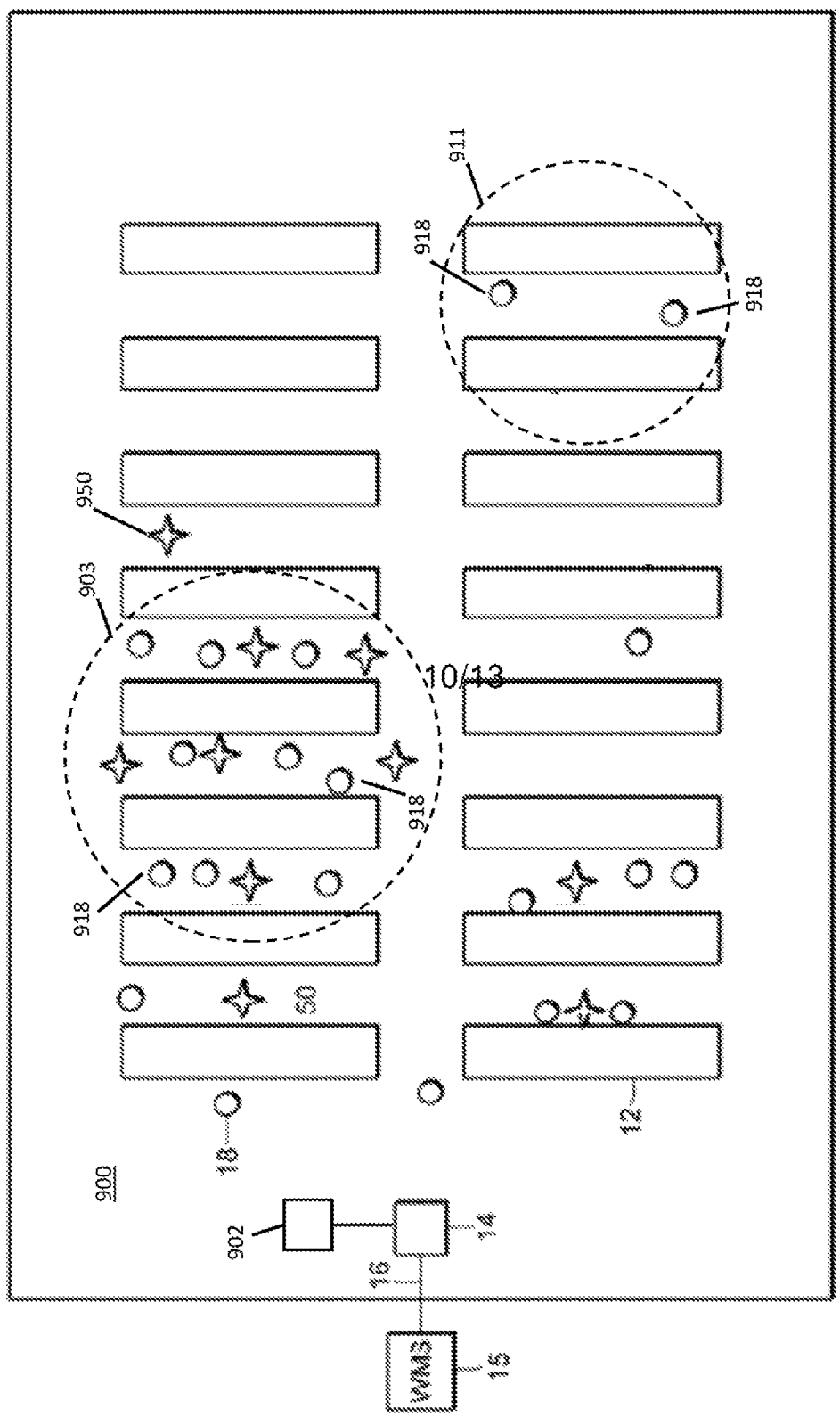
FIG. 9 map of robot and human activity within a warehouse.

Furthermore, when many robots are clustered in discrete congested locations 903, as shown in FIG. 9, undirected human operators 50, in the interests of maximizing personal task completion rate and of servicing the clustered robots 18, may also tend to cluster in those areas in order to execute the tasks associated with those robots 18, thereby creating a new congested area 903 and/or exacerbating an existing congestion issue. Additionally, if many human operators 50 and robots 18 are clustered together, unattended robots 918 operating in less active portions (e.g., remote area 911) of the navigational space can be left unassisted by human operators 50 for extended periods of time, thus causing increased dwell time for those robots 18 and further reducing efficiency.

In order to increase human operator 50 efficiency, reduce human operator 50 related congestion, and to mitigate dwell time of unattended robots 918, described herein are systems and methods for personnel routing. In particular, each robot 18 can be configured to render a next task recommendation on a display (e.g., the display of the tablet 48) to an operator 50.

As shown in FIG. 9, in some navigational spaces, human operators 50, untasked human operators 950, robots 18, and unattended robots 918 can be located in congested areas 903, in remote areas 911, or more generally throughout the navigational space. As illustrated in FIG. 9, an untasked human operator 950 (e.g., an operator 50 that has just finished a task and is seeking a new unattended robot 918 to assist) is positioned in an aisle with no unattended robots 918 to assist. Initially, the untasked operator 950 may not know where to head next and may spend time wandering to find an unattended robot 918.

In the scenario depicted in FIG. 9, because the untasked operator 950 cannot see any unattended robots 918, the untasked operator 950 will likely head toward the sound of other activity to seek out unattended robots 918. In the scenario shown in FIG. 9, the untasked operator is thus likely to head for the nearby congested area 903. However, in the congested area 903 of FIG. 9, there are six human operators 50 and only two unattended robots 918. Thus, the untasked operator 950 would only exacerbate congestion and add little value.

Meanwhile, other unattended robots 918 are located in a remote area 911 away from the congested area 903. As shown in FIG. 9, such unattended robots 918 may be so remote as to have no human operators proximate thereto. Accordingly, dwell times for such robots, waiting for a human operator 50 to come assist completion of each unattended robot's 918 current task, can be elongated, thereby causing substantial inefficiency with respect to execution of that unattended robot's 918 task list.

Figure 10:
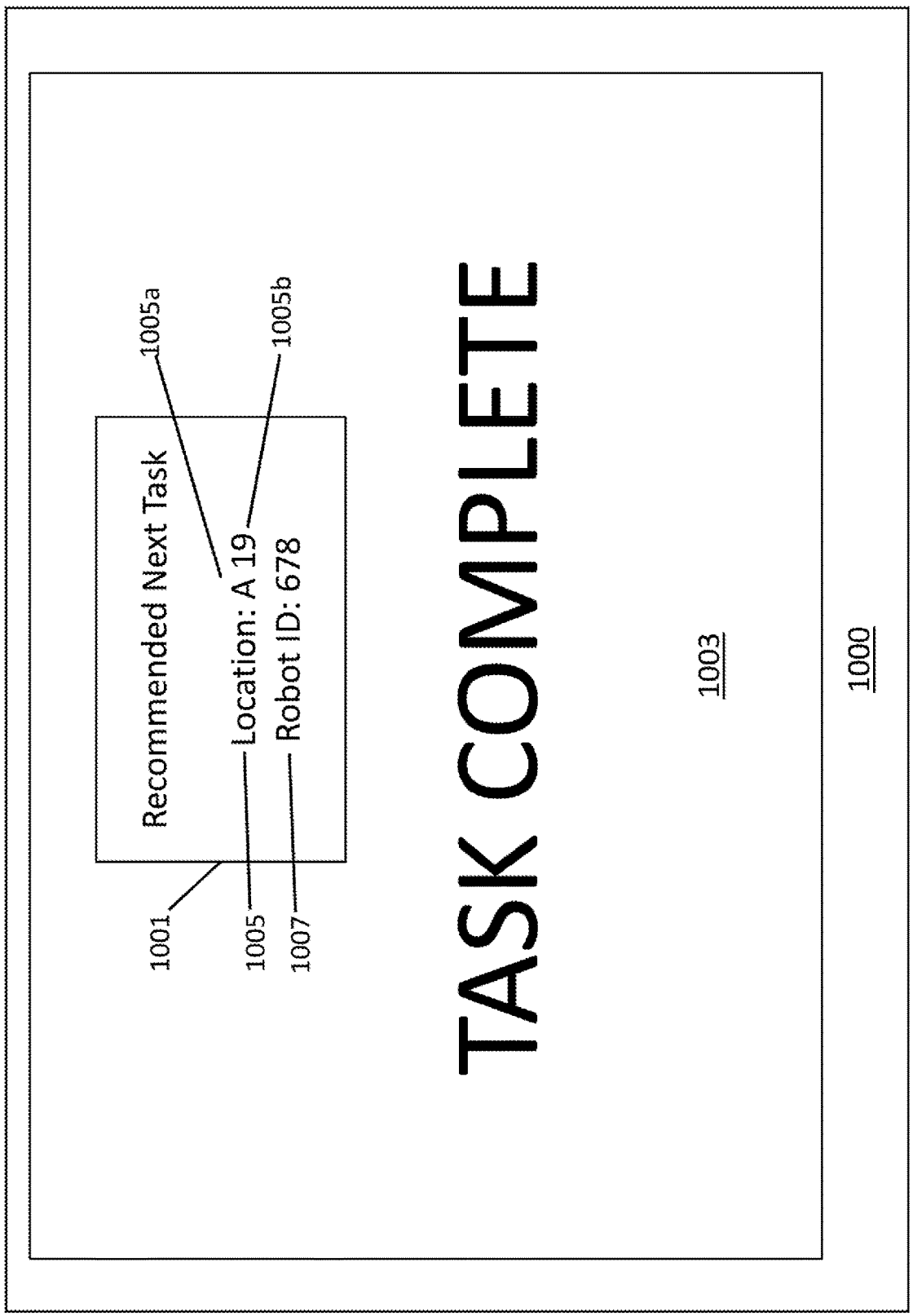
FIG. 10 is a diagram illustrating an example next pick recommendation rendered on the tablet of the robot shown in FIG. 3.

In some embodiments, to provide untasked operators 950 with direction regarding where to go next, improve task completion rates for unattended robots 918, and to manage human operator 50 related congestion, a personnel routing system is provided. In particular, as shown in FIG. 10, upon completion of a current task, the robot 18 can receive status information corresponding to at least one unattended robot 918 and, using the status information, can determine a next task recommendation 1001 for directing the user to a recommended unattended robot 918.

In some embodiments, the robot 18 can receive the status information directly from each of the at least one unattended robot 918. In some embodiments, the robot 18 can receive the status information from a robot monitoring server 902. The robot monitoring server 902 can be any server or computing device capable of tracking robot and/or human operator activity within the navigational space, including, for example, the warehouse management system 15, the order-server 14, a standalone server, a network of servers, a cloud, a processor and memory of the robot tablet 48, the processor and memory of the base 20 of the robot 18, a distributed system comprising the memories and processors of at least two of the robot tablets 48 and/or bases 20. In some embodiments, the status information can be pushed automatically from the robot monitoring server 902 to the robot 18. In other embodiments, the status information can be sent responsive to a request from the robot 18.

Upon receipt of the status information, the robot 18 can use the status information to determine one or more recommendation factors associated with each unattended robot 918. For example, the robot 18 can use the status information to determine whether a pose location of the unattended robot 918 is in a congested state (i.e. positioned in a congested area 903) as described above. Additionally, in some embodiments, efficiency can be improved by minimizing a distance between the robot 18 and the recommended unattended robot 918 of the next task recommendation 1001. In some embodiments, proximity can be determined according to, for example, a straight line distance between an (x,y,z) position of the robot 18 and an (x,y,z) position of the unattended robot 918. In some embodiments, proximity can be determined according to a triangulation calculation between the (x,y,z) position of the robot 18 and the (x,y,z) position of at least two unattended robots 918. In some embodiments, proximity can be determined according to a walking/traveling distance between the (x,y,z) position of the robot 18 and the (x,y,z) position of the unattended robot 918 based on known obstructions such as, for example, shelves 12 as shown in FIG. 1 or other no-go areas associated with the SLAM map or other knowledge of the navigational space.

Other recommendation factors can include number of human operators 50 proximate each unattended robot 918, a ratio of human operators 50 to unattended robots 918 proximate the each unattended robot 918, priority of the task to be completed by each unattended robot 918, current dwell time of the unattended robot 918, or combinations thereof. By considering such recommendation factors, the personnel routing system can improve task completion efficiency within the navigational space. For example, such recommendation factors can permit the personnel routing system to minimize travel distance, minimize travel time, minimize likely dwell time of the recommended unattended robot 918, avoid obstacles or congested areas, or combinations thereof. In some embodiments, consideration of multiple recommendation factors can lead to more optimal results. For example, where an unattended robot 918 is located in a congested area 903, the personnel routing system may default to weighing against directing a human operator 50 to the congested area 903. However, if there are insufficient human operators 50 to service the robots 18 in the congested area 903, then the personnel routing system may determine that location of the unattended robot 918 in the congested area 903 weighs in favor of directing the human operator 50 to the congested area 903.

Similarly, in some embodiments, a default preference may be to direct the human operator 50 to the nearest unattended robot. However, if the robot 18 is located within the congested area, there may be a plurality of unattended robots 918 positioned in close proximity to the robot 18 (and the attending human operator 50) as well as a large number of human operators 50 available to service those nearby unattended robots 918. At the same time, there may be no (or very few) human operators 50 close enough to service other unattended robots 918 such as those located in the remote area 911. The personnel routing system may then determine that such circumstances weigh in favor of directing the human operator 50 to the more distant unattended robots 918 located in the remote area 911.

Referring again to FIG. 10, the robot 18 can communicate the next task recommendation 1001 to the human operator 50 by rendering the recommendation 1001 on a display 1000

(e.g., the display of the tablet 48) of the robot 18. In some embodiments, the next task recommendation 1001 can be automatically rendered upon completion of a current task, rendered responsive to an input of the human operator 50, or combinations thereof. For example, as shown in FIG. 10, in some embodiments, the next task recommendation 1001 can be automatically rendered as an interactive graphical object within a task completion interface 1003 indicating completion of the current task. The next task recommendation 1001 can generally include a location 1005 and/or a robot identification 1007 of the recommended unattended robot 918.

The location 1005 can generally include one or more of an aisle identifier 1005a, a stack identifier 1005b, a shelf identifier, an (x,y,z) location, any other suitable location indicating information, or combinations thereof. In particular, in FIG. 10, the location 1005 includes a letter identifying a particular aisle 1005a and a number identifying a particular stack 1005b. The robot identification 1007 can generally include any suitable identifier for permitting the human operator 50 to verify an identity of the recommended unattended robot 918 when approaching to perform the next task.

Although the next task recommendation 1001 is shown in FIG. 10 as being a proportionally small interactive graphical object indicating the location 1005 and identity 1007 of a single recommended unattended robot 918, it will be apparent in view of this disclosure that the next task recommendation 1001 can be rendered in any size and/or that the interactive graphical object can be configured to indicate any number of next pick recommendations 1001 each corresponding to a recommended unattended robot 918 for selection by the human operator 50. To the extent that there are multiple next task recommendations 1001 indicated, the interactive graphical object can be configured to accept a human operator 50 input selecting which next task recommendation 1001 the human operator 50 will accept and attend to.

Figure 11:
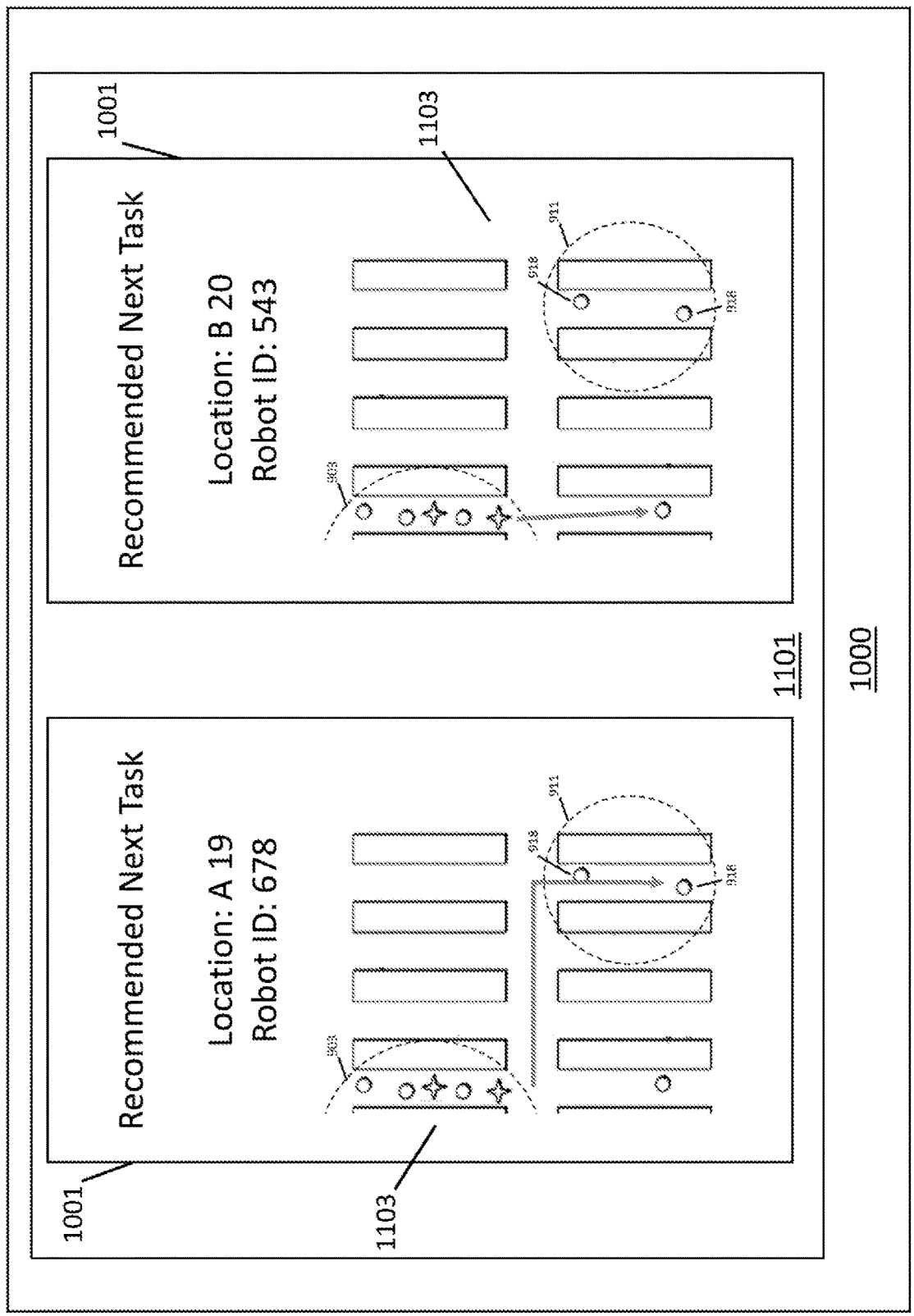
FIG. 11 is a diagram illustrating another example next pick recommendation rendered on the tablet of the robot shown in FIG. 3.

In some embodiments, the interactive graphical object can be configured such that the human operator 50 can touch or "click" the object to open a larger interactive recommendation 1101 screen. As shown in FIG. 11, the interactive recommendation 1101 can indicate a plurality of next task recommendations 1001 and corresponding locations 1005 and identifications 1007. In some embodiments, the interactive recommendation 1101 can advantageously provide larger, more legible text than the smaller, partial screen shown in FIG. 10, especially where multiple next task recommendations 1001 are presented.

Furthermore, additional information can be presented to the human operator in the interactive recommendation 1101 screen. For example, as shown in FIG. 11, a map 1103 is rendered for each next task recommendation 1001, thus providing the human operator 50 with visual guidance, rather than relying on the human operator's recollection of a particular facility layout. In some embodiments, each next task recommendation 1001 within the interactive recommendation 1101 screen can be rendered as a separate interactive graphical object. In some embodiments, for example, the map 1103 can be displayed as a plan view of a predetermined area surrounding the robot, which typically represents a portion of the warehouse in proximity to the robot but, in some embodiments, can include a view of the entire warehouse. In some embodiments, the overall warehouse layout may be divided into a plurality of regions and the predetermined area displayed in the map 1103 surrounding the robot could correspond to the one of the plurality of regions in which the robot is located. In some embodiments, the map 1103 can include renderings of shelving units and graphical representations of other robots within a predetermined area.

In some embodiments, the map 1103 can also include graphical representations of human operators 50 attending to orders associated with one or more robots 18 within the field of view of the map 1103. In general, the map 1103 may be useful in permitting the human operator 50 determine which next pick recommendation 1001 to select based on, for example, distance to the unattended robot 918 associated with the next pick recommendation 1001 and/or number of additional unattended robots 918 proximate the unattended robot 918 associated with the next pick recommendation 1001.

To the extent that there are multiple next task recommendations 1001 indicated, the interactive recommendation can be configured to accept a human operator 50 input selecting which next task recommendation 1001 the human operator 50 will accept and attend to. In such embodiments, the robot 18 can communicate the selection to the robot monitoring system 902, thereby designating the selected task and unattended robot 918 as "in process" within the personnel routing system to avoid redundant recommendation. In such embodiments, the personnel routing system can also effect visual, audio, or other status indicator changes to the unattended robot 918 associated with the next pick recommendation 1001 selected by the operator 50 so as to indicate that the robot has already been selected for task execution. In particular, such status indicators can be provided to deter other human operators in the area from trying to assist/claim the unattended robot 918. The status indicator may be represented by changing a color or intensity of one or more of the display of the tablet 48 of the unattended robot 918, a graphical object rendered in the display of the tablet 48, or one or more lights of the unattended robot 918. The status indicator may additionally or alternatively be represented by causing one or more of the display of the tablet 48 of the unattended robot 918, a graphical object rendered in the display of the tablet 48, or one or more lights of the unattended robot 918 to blink, flash, or pulse.

In order to account for human error, unexpected events, and/or other failures to execute, the "in process" designation can, in some embodiments, be removed by the personnel routing system if the task is not completed within a prescribed time limit.

It will be apparent in view of this disclosure that the example personnel routing and congestion management techniques are described above for illustration purposes only and that any other beacon message, beacon configuration, receiver configuration, or proximity operation mode can be implemented in accordance with various embodiments.

Non-Limiting Example Computing Devices

Figure 12:
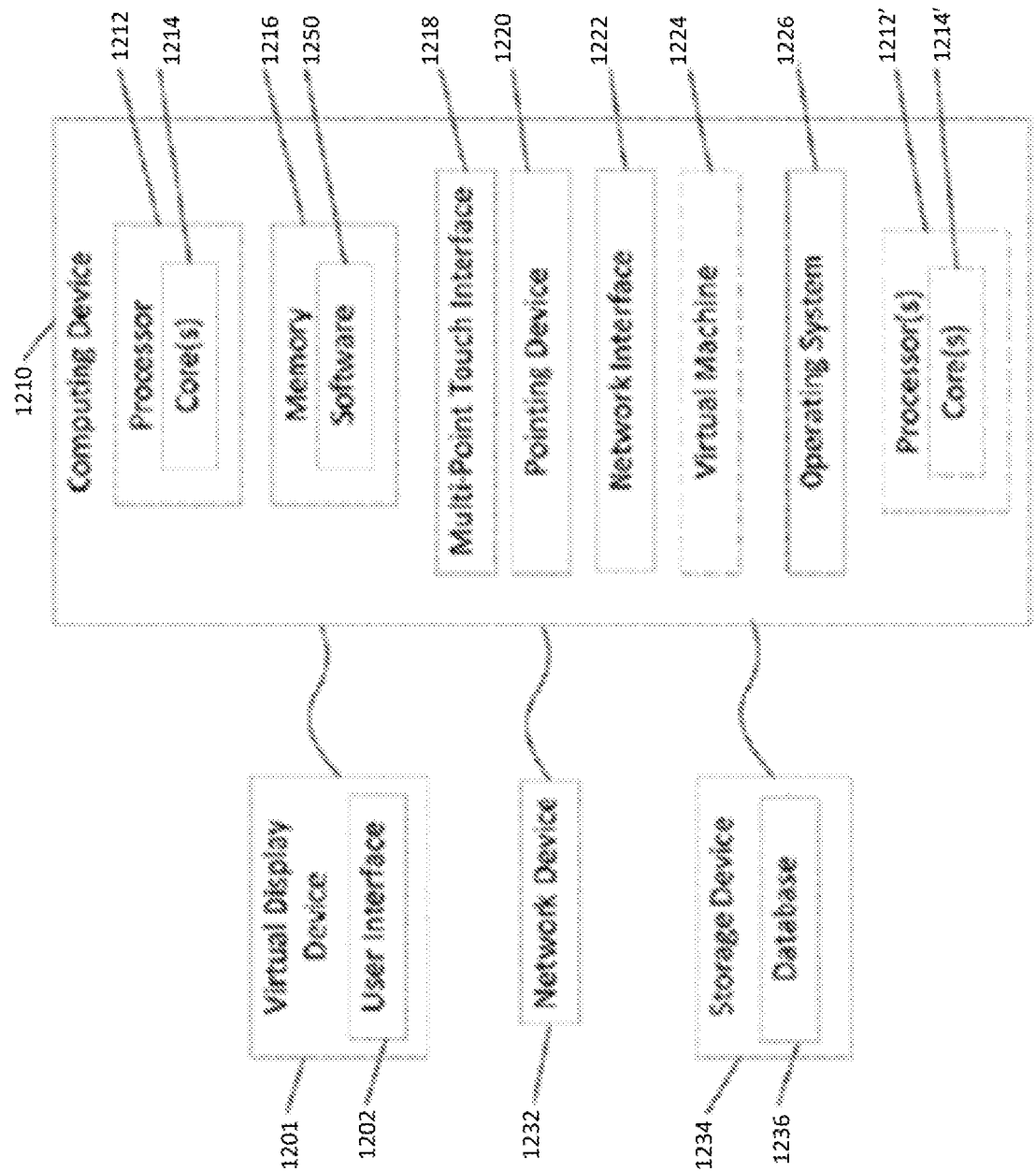
FIG. 12 is a block diagram of an exemplary computing system.

FIG. 12 is a block diagram of an exemplary computing device 1210 such as can be used, or portions thereof, in accordance with various embodiments as described above with reference to FIGS. 1-11. The computing device 1210 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1216 included in the computing device 1210 can store computer-readable and computer-executable instructions or software for performing the operations disclosed herein. For example, the memory can store software application 1240 which is programmed to perform various of the disclosed operations as discussed with respect to FIGS. 1-11. The computing device 1210 can also include configurable and/or programmable processor 1212 and associated core 1214, and optionally, one or more additional configurable and/or programmable processing devices, e.g., processor(s) 1212' and associated core (s) 1214' (for example, in the case of computational devices having multiple processors/cores), for executing computer-readable and computer-executable instructions or software stored in the memory 1216 and other programs for controlling system hardware. Processor 1212 and processor(s) 1212' can each be a single core processor or multiple core (1214 and 1214') processor.

Virtualization can be employed in the computing device 1210 so that infrastructure and resources in the computing device can be shared dynamically. A virtual machine 1224 can be provided to handle a process running on multiple processors so that the process appears to be using only one computing resource rather than multiple computing resources. Multiple virtual machines can also be used with one processor.

Memory 1216 can include a computational device memory or random access memory, such as but not limited to DRAM, SRAM, EDO RAM, and the like. Memory 1216 can include other types of memory as well, or combinations thereof.

A user can interact with the computing device 1210 through a visual display device 1201, 111A-D, such as a computer monitor, which can display one or more user interfaces 1202 that can be provided in accordance with exemplary embodiments. The computing device 1210 can include other I/O devices for receiving input from a user, for example, a keyboard or any suitable multi-point touch interface 1218, a pointing device 1220 (e.g., a mouse). The keyboard 1218 and the pointing device 1220 can be coupled to the visual display device 1201. The computing device 1210 can include other suitable conventional I/O peripherals.

The computing device 1210 can also include one or more storage devices 1234, such as but not limited to a hard-drive, CD-ROM, or other computer readable media, for storing data and computer-readable instructions and/or software that perform operations disclosed herein. Exemplary storage device 1234 can also store one or more databases for storing any suitable information required to implement exemplary embodiments. The databases can be updated manually or automatically at any suitable time to add, delete, and/or update one or more items in the databases.

The computing device 1210 can include a network interface 1222 configured to interface via one or more network devices 1232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1222 can include a built-in network adapter, network interface card, PCMCIA network card, card bus network adapter, wireless network adapter, USB network adapter, modem or any other device suitable for interfacing the computing device 1210 to any type of network capable of communication and performing the operations described herein. Moreover, the computing device 1210 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1210 can run any operating system 1226, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 1226 can be run in native mode or emulated mode. In an exemplary embodiment, the operating system 1226 can be run on one or more cloud machine instances.

Figure 13:
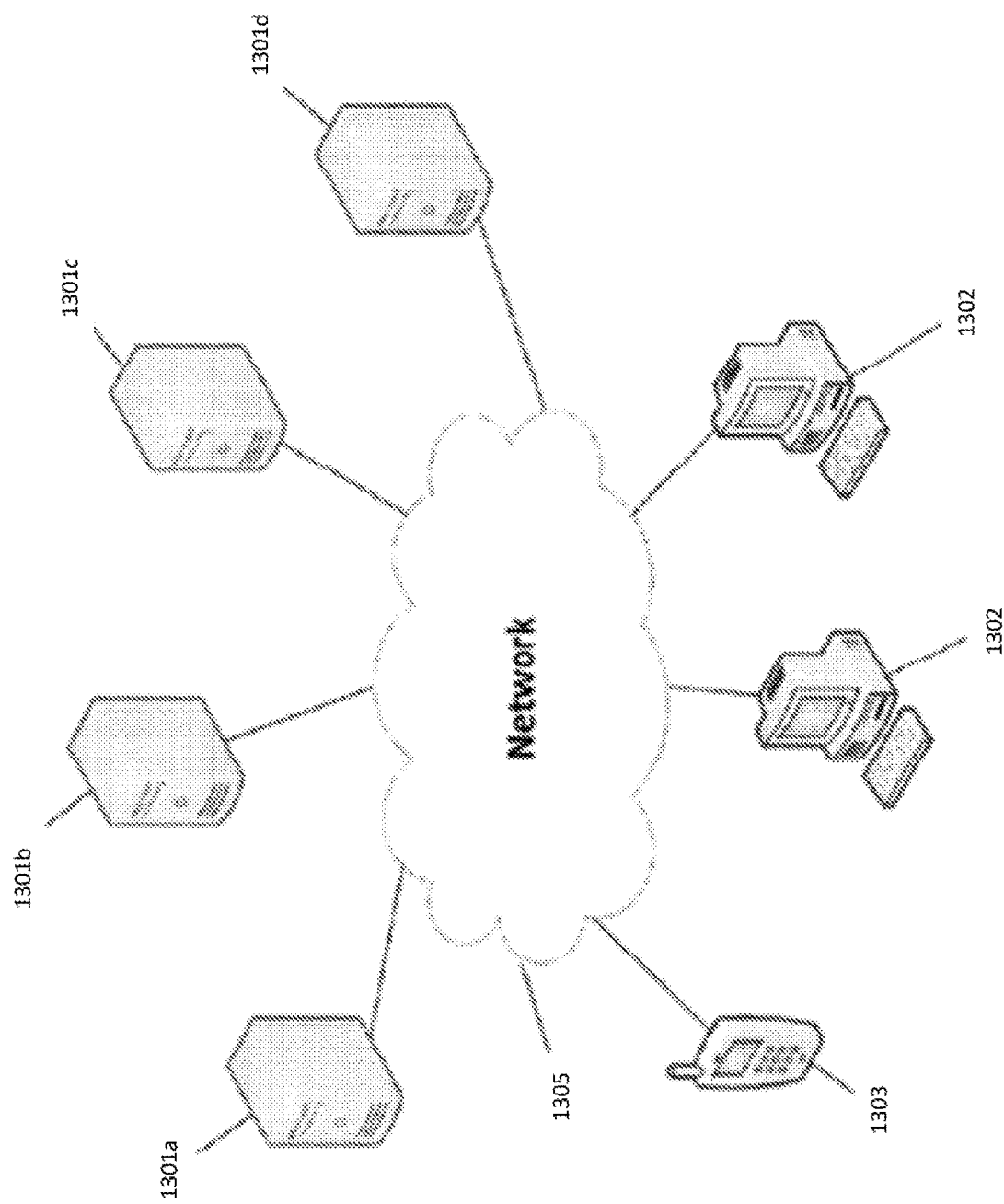
FIG. 13 is a network diagram of an exemplary distributed network.

FIG. 13 is an example computational device block diagram of certain distributed embodiments. Although FIGS. 1-11, and portions of the exemplary discussion above, make reference to a warehouse management system 15, order-server 14, or robot tracking server 902 each operating on an individual or common computing device, one will recognize that any one of the warehouse management system 15, the order-server 14, or the robot tracking server 902 may instead be distributed across a network 1305 in separate server systems 1301*a-d* and possibly in user systems, such as kiosk, desktop computer device 1302, or mobile computer device 1303. For example, the order-server 14 may be distributed amongst the tablets 48 of the robots 18. In some distributed systems, modules of any one or more of the warehouse management system software and/or the order-server software can be separately located on server systems 1301*a-d* and can be in communication with one another across the network 1305.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is:

What is claimed is:

1. A robot assisted personnel routing system comprising:
 a plurality of autonomous robots operating within a navigational space, each robot including:
 a processor; and
 a memory, the memory storing instructions that, when executed by the processor, cause the autonomous robot to:
 detect completion of a task operation by a human operator, the task operation being associated with the autonomous robot,
 receive status information corresponding to a plurality of other robots operating within a navigational space, the status information including at least one of a location or a wait time associated with the plurality of other robots, determine, from the status information, a next robot recommendation from the plurality of other robots to direct the human operator to perform a next task operation, and
render, on a display of the autonomous robot, a location of the next robot recommendation for the human operator to perform the next task operation, for viewing by the human operator.

2. The system of claim 1, wherein:
the status information includes an (x,y,z) position of the plurality of other robots within the navigational space, and
the next robot recommendation is selected by determining a minimum straight line distance to the plurality of other robots.

3. The system of claim 1, wherein the next robot recommendation is selected in response to one or more efficiency factors, including a dwell time of each the plurality of other robots, a straight-line proximity of each of the plurality of other robots, a number of human operators proximate each of the plurality of other robots, a walking distance to each of the plurality of other robots, a priority of a task associated with each of the plurality of other robots, a congestion proximate each of the plurality of other robots or combinations thereof.

4. The system of claim 1, wherein the next robot recommendation is rendered as an interactive graphic on the display.

5. The system of claim 4, wherein, responsive to human operator input received by the interactive graphic, an expanded graphic is rendered to one or more of provide additional information about the next task operation associated with the next robot recommendation, present additional next robot recommendations to the human operator, or combinations thereof.

6. The system of claim 5, wherein the expanded graphic includes one or more additional interactive graphics.

7. The system of claim 4, wherein the interactive graphic is configured to record a selection by the human operator of the next robot recommendation.

8. The system of claim 7, wherein the memory further includes storing instructions that, when executed by the processor, cause the autonomous robot to, responsive to the recorded selection of the next robot recommendation, designate the next task operation associated with the selected next robot recommendation as in process within the personnel routing system to avoid redundant recommendation.

9. The system of claim 8, wherein the in process designation is removed if the next task operation associated with the selected next robot recommendation is not completed within a prescribed time limit.

10. The system of claim 1, wherein the status information is directly received from the at least one other robot.

11. The system of claim 1, wherein the status information is received from a robot monitoring server for monitoring robots within the navigational space, wherein the robot monitoring server is at least one of integrated with at least one of an order-server of the navigational space, integrated with a warehouse management system of the navigational space, a standalone server, a distributed system comprising the processor and the memory of at least two of the plurality of robots, or combinations thereof.

12. The system of claim 1, wherein the navigational space is a warehouse.

13. The system of claim 12, wherein the at least one next task operation is at least one of a pick operation, a put operation, or combinations thereof to be executed within the warehouse.

14. A method for robot assisted personnel routing, comprising:
providing a plurality of autonomous robots operating within a navigational space, each autonomous robot:
detecting, by a processor and a memory, completion of a task operation by a human operator, the task operation being associated with the autonomous robot;
receiving, by a transceiver of the autonomous robot, status information corresponding to a plurality of other robots the status information including at least one of a location or a wait time associated with the plurality of other robots;
determining, from the status information, at least one next robot recommendation for directing the human operator to perform a next robot for a next task operation; and
rendering, on a display of the autonomous robot, a location of the next robot recommendation for viewing by the human operator.

15. The method of claim 14, wherein the status information includes an (x,y,z) position of the plurality of other robots within the navigational space, the method further comprising:
selecting the next robot recommendation by determining a minimum straight line distance to the plurality of other robots.

16. The method of claim 14, further comprising:
selecting the next robot recommendation responsive to one or more efficiency factors, including a dwell time of each of the plurality of other robots, a straight-line proximity of each of the plurality of other robots, a number of human operators proximate each of the plurality of other robots, a walking distance to each of the plurality of other robots, a priority of a task associated with each of the plurality of other robots, a congestion proximate each of the plurality of other robots, or combinations thereof.

17. The method of claim 14, further comprising rendering the next robot recommendation as an interactive graphic on the display.

18. The method of claim 17, further comprising rendering an expanded graphic responsive to human operator input received by the interactive graphic to one or more of provide additional information about the next task operation associated with the next robot recommendation, present additional next robot recommendations to the human operator, or combinations thereof.

19. The method of claim 18, wherein the expanded graphic includes one or more additional interactive graphics.

20. The method of claim 17, further comprising:
recording, by the interactive graphic, a selection by the human operator of a next robot recommendation; and
designating, responsive to recorded selection, the selected task operation associated with the next robot as in process within the personnel routing system to avoid redundant recommendation.

* * * * *